(12) United States Patent
Morley et al.

(10) Patent No.: US 6,908,324 B1
(45) Date of Patent: Jun. 21, 2005

(54) CONNECTOR SCHEME TO ALLOW PHYSICAL ORIENTATION OF A COMPUTER PERIPHERAL

(75) Inventors: Kenneth S. Morley, Draper, UT (US); Scott M. Christensen, Orem, UT (US)

(73) Assignee: 3Com Corporation, Santa Clara, CA (US)

( * ) Notice: Subject to any disclaimer, the term of this patent is extended or adjusted under 35 U.S.C. 154(b) by 420 days.

(21) Appl. No.: 09/658,108

(22) Filed: Sep. 8, 2000

(51) Int. Cl.⁷ .............................................. H01R 27/00
(52) U.S. Cl. .................... 439/218; 439/640; 439/11
(58) Field of Search ............................... 439/218, 851, 439/850, 842, 845, 849, 217, 222, 638, 11, 171, 120, 675, 578

(56) References Cited

U.S. PATENT DOCUMENTS

| | | | | |
|---|---|---|---|---|
| 4,764,121 A | * | 8/1988 | Ditzig | 439/21 |
| 4,932,902 A | * | 6/1990 | Crane, Jr. | 439/627 |
| 5,538,437 A | * | 7/1996 | Bates et al. | 439/352 |
| 5,766,025 A | * | 6/1998 | Davis | 439/660 |
| 5,880,721 A | * | 3/1999 | Yen | 345/327 |
| 6,394,813 B1 | * | 5/2002 | Stout et al. | 439/11 |
| 6,435,409 B1 | * | 8/2002 | Hu | 235/441 |
| 6,554,621 B1 | * | 4/2003 | Margalit et al. | 439/41 |
| 6,612,874 B1 | * | 9/2003 | Stout et al. | 439/640 |
| 6,695,620 B1 | * | 2/2004 | Huang | 439/11 |
| 6,786,734 B2 | * | 9/2004 | Yu | 439/11 |

* cited by examiner

Primary Examiner—Ross Gushi
Assistant Examiner—Phuongchi Nguyen
(74) Attorney, Agent, or Firm—Workman Nydegger

(57) ABSTRACT

An adapter mechanism for facilitating re-orientation of a plug having an original orientation that is unsuitable for a peripheral device is presented. Re-orientation of a peripheral device is possible in an embodiment by advancing a symmetrical interface to another mating position exhibiting a hospitable orientation. An adaptor maintains USB functionality while providing the ability to reorient a fixedly attached peripheral. The adaptor mechanism also allows a USB wireless peripheral device with an antenna to plug directly into the USB receptacle connector on a digital device while orienting the antenna upwards to improve the quality of the transmitted and received signals.

15 Claims, 4 Drawing Sheets

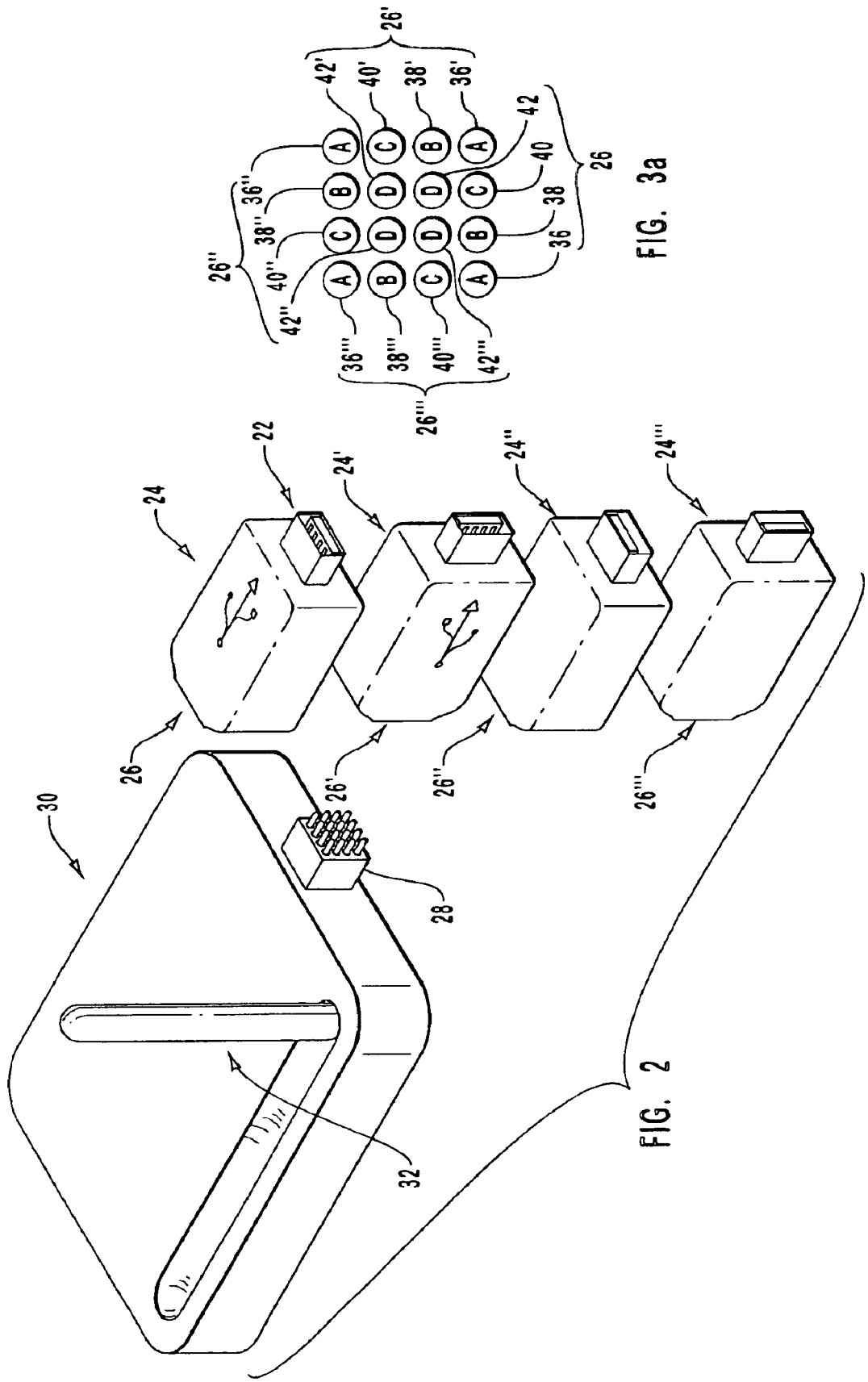

CONNECTOR SCHEME TO ALLOW PHYSICAL ORIENTATION OF A COMPUTER PERIPHERAL

BACKGROUND OF THE INVENTION

1. Field of the Invention

The present invention relates generally to adaptor structures selectively coupled to an interface on a digital device. More specifically, the present invention applies to an adaptor for directly coupling to a peripheral device and selectively coupling to a digital device regardless of the digital device's interface orientation or position.

2. Description of Related Art

Adding an old-fashioned peripheral device to a digital device, such as a personal computer, can be a very difficult process. The user is often required not only to have considerable computer expertise, but also a certain amount of providence. First, the user must determine which port from a vast assortment of possibilities on the digital device to use. Then in most cases, the user must open the digital device to install a peripheral device controller card and set various DIP switches. Finally, the user must properly configure the touchy IRQ settings, not to mention other machine specific alterations. This process was almost enough to deter even the most resourceful users from even thinking about adding a new peripheral to their digital device.

The industry recognizes that standardization of peripheral device interfaces, among other things, greatly increases the demand for peripheral devices and as such the industry has developed a wide variety of standard peripheral device interfaces. The most common of these peripheral device interfaces are serial ports and parallel ports. Unfortunately, as computer processor speeds and user performance expectations continue to increase, it is apparent that the older and traditional peripheral device interfaces no longer communicate at fast enough rates for the modern peripherals.

In view of the configuration hassles previously associated with customized peripheral device interfaces and the speed and bandwidth limitations of available standardized peripheral device interfaces, several manufacturers collaborated to develop the Universal Serial Bus (USB) specification. USB connects computers and peripherals. USB devices provide a user with an easy, compact device that can connect to most digital devices. The speed ranges of the USB peripheral-to-PC connection are 480 Mbits/s on USB 2.0, 12 Mbits/s on USB 1.1, and 1.5 Mbits/s on USB 1.0. The higher bandwidth of USB peripheral device interfaces allow for support of applications, such as wireless networking, digital image creation, and web publishing.

Now, many electronic devices being manufactured, especially those requiring an instant, no-hassle, high-speed connection are adapted to accommodate these standards. Digital photography, digital imaging, PC-telephony, and video conferencing, in particular, are increasingly popular for both business and personal applications due in part to the development of USB compatible peripheral devices designed to increase the functionality of the computers in these areas. As an example, USB devices are commonly used to provide added features and/or functions. For instance, USB allows quick connections for a new digital joystick, a scanner, a set of digital speakers, a digital camera, a PC telephone to the computer, or other USB device supplying add-on functionality.

The USB specification also developed and promulgated standards for the physical design, dimensions, and electrical interface of peripheral devices using a keyed connector protocol. Specifically, the USB standard identifies two primary connector types: Series A and B. These connector types correspond to physical dimension restrictions that insure proper end user connectivity. Series "A" connectors are the principle means of connecting USB devices directly to a host computer system or to the downstream port of a hub. The series "A" receptacles provide a downstream output interface from the USB host system or hub. The series "A" plugs electrically and mechanically couple with the series "A" receptacles such that the plugs are always oriented upstream towards the host system. The series "B" connectors are used as one available means of connecting a USB cable to the peripheral device and allowing peripheral device vendors to provide the user with a standard detachable cable for use with their device. As such the series "B" plug is always oriented downstream towards the USB device and series "B" receptacle. Unfortunately, both types of connectors have a fixed orientation with respect to the receptacles for receiving the plugs on the host and peripheral device.

Currently, USB series "A" receptacles can be found on current notebook computers in all of the four possible 90-degree orientations. One common problem presently faced by many USB peripheral devices is how to attach a peripheral, which requires a specific orientation, via a USB plug to a USB receptacle in each of the possible orientations without using multiple joints or a cable to reorient the peripheral. Other industry attempts to solve this problem require either an attached cable or multiple joints. Unfortunately, the attached cable solution does not allow direct connection to the computer, as a finite length of cable is necessary before it can reorient the peripheral, and thus the cable retains a residual amount of rotational tension. The use of multiple joints is also undesirable as these connections are expensive and not reliable. It would be an advance over the present state of the art to develop an adaptor that maintained all of the USB functionality, but improved the ability of the adaptor to reorient an interface for the attached peripheral thereby increasing the functionality and control of the attached peripheral.

Exemplary USB peripheral devices that require specific orientation include short-range wireless devices and USB antenna structures. Antenna structures, predominantly used for wireless communication, efficiently transmit and receive electromagnetic energy in the form of radio waves. Antenna structures are used whenever it is impractical, or impossible to use a physical connection, such as a transmission line or wave-guide. In order to get the best performance out of a wireless antenna, the antenna must not be obstructed by anything within its path of radiation. Conventional antennas used to connect a digital device to a wireless communication system or cellular telephone are typically placed externally from the digital device because of the noise, interference, obstruction and shielding caused by the various components of the digital device. In particular, conventional antennas do not function correctly if they are obstructed or shielded by the housing or other structures of the digital device. As such USB antenna structures, if properly oriented, can avoid many of the aforementioned problems. Additionally, USB antennas are externally located, typically have high bandwidth capabilities, and are selectively detachable from the USB receptacle. However, the use of multiple joints or a cable hinders the performance of the USB antenna by reducing the available power for radiation. The use of easy attachment and configuration USB antennas are good for the progress and integration of wireless communication.

One short-range wireless standard that is in the process of being embraced is preliminarily known by the name of "Bluetooth." Bluetooth, which is only one example of a short-range wireless standard, is actually a combination of specialized computer chips and software. Bluetooth is the codename for a technology specification for small form factor, low-cost, short-range radio links between mobile PDAS, PCs, mobile phones and other portable devices. Bluetooth, for example, also offers speedy transmission of up to one megabyte per second, over 17 times as fast as a typical modem. One of the present Bluetooth specification restrictions is to limit the transmission range so that the resulting radiation pattern typically does not exceed 10 meters.

The EEEE 802.11 RF wireless standards: 802.11 HR, 802.11b, and 802.11 @ 5 GHz standards are also very popular. Other exemplary short-range wireless standards potentially useful with USB antenna structures include: HiperLan, HiperLan II, HomeRF, SWAP, OpenAir, and other wireless protocols. These wireless standards enable users to connect a wide range of computing and telecommunications devices easily and simply, without the need to buy, carry, or connect cables. They deliver opportunities for rapid ad hoc connections, and the possibility of automatic, unconscious, connections between devices. They may virtually eliminate the need to purchase additional or proprietary cabling to connect individual devices. Because these standards can be used for a variety of purposes, they will also potentially replace multiple cable connections via a single radio link. If properly oriented USB antenna structures can greatly improve the development and integration of these standards into a home computer thereby facilitating a wireless computing environment.

SUMMARY OF THE INVENTION

The present invention creates a communication quality connection across an interface between a digital device and a peripheral device, while enabling the flexible orientation of the peripheral device relative to the interface. These qualities are primarily accomplished through an adaptor, which includes two connectors one for coupling to the digital device and a second connector for coupling to the peripheral device. The adaptor electrically extends the interface signals to the second connector, which facilitates peripheral orientation.

The present invention has been developed in response to the current state of the art, and in particular, in response to these and other problems and needs that have not been fully or completely solved by currently available connectors for peripheral devices. Thus, it is an overall object of the present invention to provide a reliable reorienting connection between the attached peripheral device and the digital device via a custom adaptor. This can be accomplished by having the adaptor attached to the peripheral device via a custom connector assembly, which can connect to the peripheral in any of the different orientations. The peripheral connector on the adaptor is wired to insure proper connection of the signals in all possible orientations. In one embodiment, a USB series "A" plug delivers the 4 USB signals to the custom connector assembly, which facilitates connection between the adaptor and the peripheral device in four different orientations. An example of the pin configuration used with this connector assembly is shown in FIG. 3.

Accordingly, one aspect of the apparatus is to provide a simple, reliable, and low cost solution to directly connecting the peripheral to the USB connector receptacle while maintaining a desired peripheral orientation. Other solutions, which may be available, compromise one of these elements.

Another aspect of the apparatus is that the adaptor provides a custom peripheral connector, which can connect to the peripheral device in different orientations without changing the peripheral connector. The custom peripheral connector on the adaptor is electrically wired in such a way so as to insure proper connection of the signals in all possible peripheral device orientations.

Yet another aspect of the apparatus is to create a USB compatible short-range wireless (e.g. "Bluetooth", 802.11 RF, etc.) interface device that properly orients the antenna and maintains all of the traditional wireless functionality. The USB connection improves the connection speed between the peripheral and host computer, thereby improving the overall wireless connections available.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof, which are illustrated in the appended drawings. Understanding that these drawing depict only typical embodiments of the invention and are not therefore to be considered to be limiting of its scope, the invention will be described and explained with additional specificity and detail through the use of the accompanying drawings in which:

FIG. 2 is a perspective view of a custom connector interface for rigidly affixing an adaptor and peripheral in one of four orientations, the coupled combination for use with a digital device as illustrated in FIG. 1;

FIGS. 3A–3E illustrate various custom connector pin assignment interfaces for use with the custom connector interfaces as illustrated in FIG. 2;

DETAILED DESCRIPTION OF THE PREFERRED EMBODIMENTS

Figure 1:
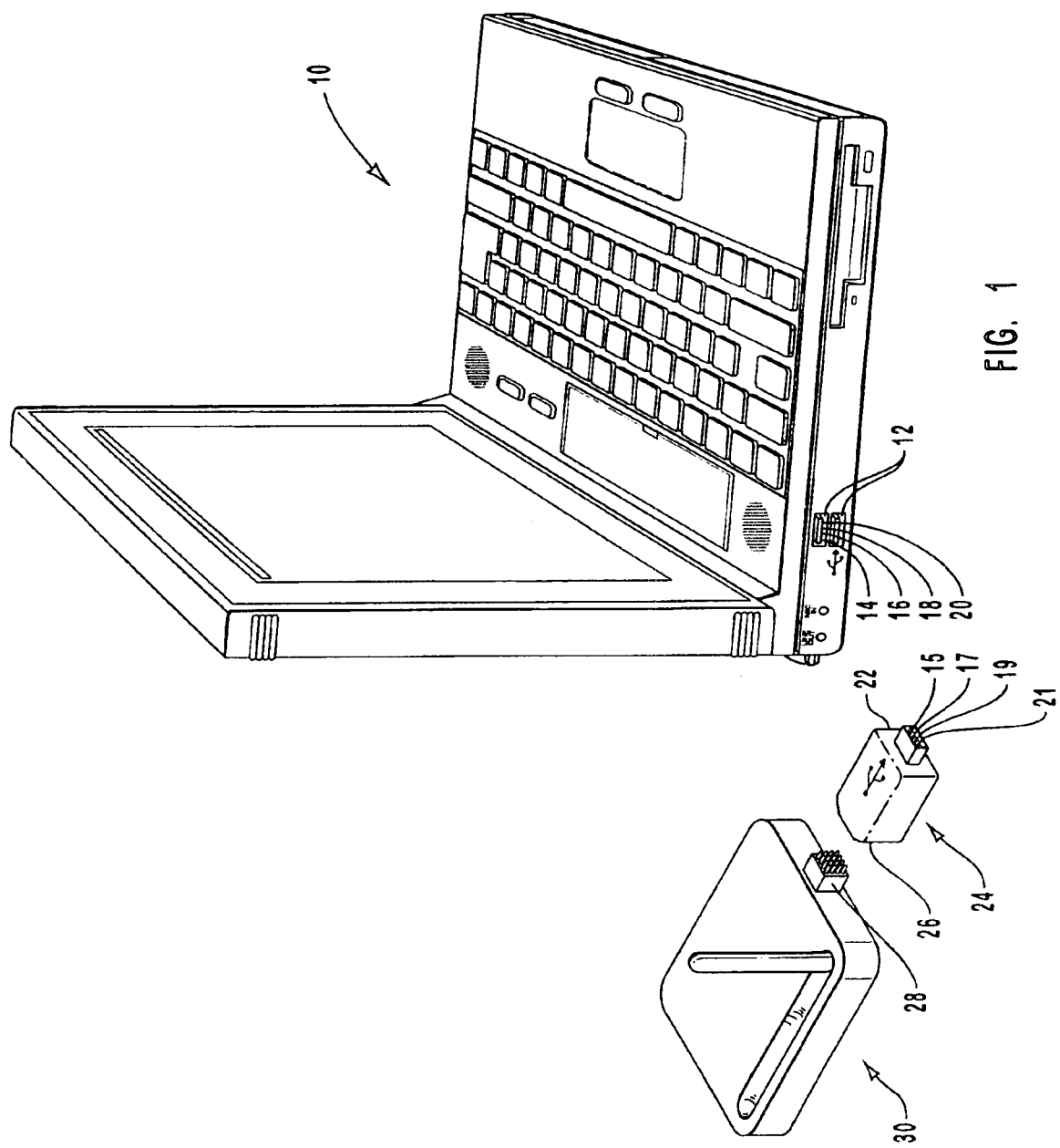
FIG. 1 illustrates an exemplary system that provides a suitable operating environment for the present invention.

FIG. 1 and the following discussion are intended to provide a brief, general description of a suitable computing environment in which the invention may be implemented. Those skilled in the art will appreciate that the invention may be practiced with many types of computer system configurations, including personal computers, hand-held devices, multi-processor systems, microprocessor-based or programmable consumer electronics, network PCs, minicomputers, mainframe computers, Personal Digital Assistants, digital cameras, and the like.

Reference is first made to FIG. 1, an exemplary laptop computer system or environment in which the present invention may be utilized or implemented. FIG. 1 is intended to be illustrative of potential systems that may utilize the present invention and is not to be construed as limiting. The system of FIG. 1 illustrates a portable computer 10 having a pair of universal serial bus (USB) series "A" connector receptacles 12 that are each configured to receive a USB series "A" plug 22. The USB receptacles having a rectangular shield shell that aligns with the shield shell of the USB plug so that the receptacle VBUS 14, D– 16, D+ 18, and GND 20 signal contacts interface with the plug VBUS 15, D– 17, D+ 19, and GND 21 signal contacts. These signals are replicated in adaptor 24 to generate a 16-pin custom adaptor interface 26 (described in more detail under FIG. 3). The adaptor interface electrically and mechanically couples with 16-pin peripheral interface 28 on peripheral device 30.

The connector receptacle 12 preferably defines a cavity that receives a portion of the connector plug 22. The receptacle 12 is preferably shaped so as to preclude insertion of electrically incompatible connector plugs. This feature prevents the inadvertent attachment of plugs that contain electrical signals that could damage electronics within the attached peripheral device. This feature also precludes insertion of inverted connector plugs. The connector receptacle 12 further comprising a retention mechanism, and the force imposed thereby, provides tactile and audible feedback to notify the user when the connector plug 22 has been securely received within connector receptacle 12. The connector receptacle 12 and retention mechanism is fashioned to mechanically fasten the connector plug 22 in the proper place. The USB connector receptacles are generally configured to removably receive a USB connector plug that is connected to one end of a USB cable. There are three supported USB adaptor assemblies for interfacing with a USB connector receptacle: a standard detached cable, a high or full speed captive cable, and a low speed captive cable. In one preferred embodiment, adaptor assembly 24 is either a high, full, or low speed series "A" plug captive cable configuration without a cable. The term "captive cable" means that the adaptor 24 is terminated on one end by a series "A" plug and on the opposite end by a vendor specific connection means (hardwired or custom detachable) for use with the peripheral device. One difference between the various cable assemblies and the present invention is the rigid coupling of the peripheral via the adaptor to the USB receptacle. By eliminating the cable between the plugs, the adaptor eliminates the residual rotational tension present in operationally reoriented cable assemblies. Furthermore, the reliability of the adaptor increases over cable assemblies that may crack and wear over time.

In contrast, the custom adaptor interface 26 is preferably shaped so as to allow insertion of an inverted peripheral interface 28, as well as any other approved peripheral orientation. In one configuration, the peripheral interface is allowed to continuous reorient itself along a series of circular contacts to optimally arrange the attached peripheral. The custom adaptor interface does, due to its customized design, inhibit the insertion of electrically incompatible connector plugs. This feature hampers the inadvertent attachment of plugs that contain electrical signals that could damage electronics within the computer. The custom adaptor interface 26 further comprises a retention mechanism, and the insertion force imposed thereby, provides tactile and audible feedback to notify the user when the peripheral interface 28 has been securely received within adaptor interface 26. The adaptor interface 26 and retention mechanism are fashioned to mechanically fasten the peripheral interface 28 in the proper place. While the custom adaptor interface 26 also selectively receives a portion of the peripheral interface 28, the extraction force of the adaptor interface and the peripheral interface exceeds the extraction force and insertion force of the connector plug and receptacle. In one configuration, the USB connector plug and receptacle exhibit an insertion force of 35 Newtons maximum at a maximum rate of 12.5 mm per minute and an extraction force of 10 Newtons minimum at a maximum rate of 12.5 mm per minute. Exceeding the extraction force of the plug and receptacle coupling insures that the adaptor interface and peripheral interface coupling will remain connected when the connector plug is removed from the connector receptacle on the computer. In one configuration, the extraction force of the adaptor interface and peripheral interface coupling is less than the cable pull-out performance of the USB connector, such that the application of a steady state axial load of 40 Newtons for one minute will result in a separation of peripheral interface from adaptor interface. In another configuration, the peripheral and adaptor interface coupling extraction force exceeds even the standard USB cable pullout specification to insure that the peripheral does not separate itself from the adaptor once it is properly oriented.

The adaptor 24 couples to peripheral device 30 illustrated as a short-range wireless device. The adaptor 24 may also couple with devices such as a scanner, digital camera, modem, a network hub or interface card, a wireless communication card including antenna, an external device controller card, or any other USB compatible peripheral device. The USB plug 22 of adaptor 24 is configured to detachably connect with a high-speed USB connector receptacle 12. The transfer rates of the USB peripheral-to-PC connections vary according to the USB version employed by the peripheral device. Presently there are three existing USB data transfer rates: High speed (480 Mbits/s using USB 2.0 or better), Full speed (12 Mbits/s using USB 1.1), and Low speed (1.5 Mbits/s using USB 1.0 or less). High and Full speeds require a shielded cable with two power conductors and a twisted pair of signal conductors. The higher bandwidth of USB peripheral device interfaces when compared to tradition serial and parallel port transfers allow for support of applications, such as wireless networking, digital image creation, and web publishing.

Inserting USB plug 22 in USB receptacle 12 permits adaptor 24 to be in electrical and physical communication with computer 10. In one preferred configuration, receptacle 12, plug 22, and adaptor 24 are USB compliant. As such, the USB connectors are designed to be hot plugged. Series "A" plugs mate with series "A" receptacles. The series "A" plug always is oriented toward the host system. Electrically, series "A" receptacles function as outputs from host systems and/or hubs. The adaptor 24 transfigures the four USB contacts of the standard USB connector, consisting of two power conductors and two signal conductors, into one of the custom connector pin assignments illustrated in FIGS. 3, 5, and 6. Ground contact 21 provides a common ground reference between the upstream and downstream ports and is replicated in adaptor 24 as contacts 42, 42', 42", and 42"' in FIG. 3a. The voltage drop across the ground lead limits the maximum cable length. The VBUS 15 contact is replicated as contacts 36, 36', 36", and 36'" in FIG. 3a, it also provides power to the connected peripheral device 30. To satisfy the USB high/full speed captive cable assembly requirements, the adaptor should satisfy the following electrical requirements: First, the adaptor must be terminated on one end with a series "A" plug and on the opposite end with a vendor specific or custom peripheral interface. If the vendor specific interconnect is to be hot plugged, it must meet the same performance requirement as the USB series "A" and "B" connectors. Second, the adaptor must be rated for high speed and full speed. Third, the adaptor impedance must match the impedance of the high speed and full speed drivers. Fourth, the drivers are characterized to drive specific adaptor impedance. The USB specification revision 2.0 § 7.1.1 provides adaptor impedance details. The maximum allowable adaptor replication breadth and length is determined by the signal pair attenuation and propagation delay. Fifth, differences in propagation delay between the two replicated signal conductors 17 and 19 must be minimized. Sixth, the ground contact 21 provides a common reference between upstream and down stream ports. The voltage drop across the ground lead limits the maximum adaptor length. The minimum wire gauge used in the adaptor is calculated using the worst-case current consumption. And, finally, the VBUS contact 15 provides power to the peripheral device via replicated contacts. The minimum wire gauge is peripheral specific, but is most preferably the same as the ground contact.

In one configuration of the present invention, the raw materials used in the fabrication of the USB to custom adaptor 24 must be of such quality that the fabricated adaptor is capable of moving or exceeding the mechanical and electrical performance criteria of the most current USB specification revision and all input federal domestic and international safety/testing agency requirements; such as, UL, CSA, BSA, NEC, etc., for electronic signaling and power distribution cables in this category.

Although adaptor 24 includes plug 22, which is illustrated as a USB Series "A" connector plug, the adaptor may also be any connector type, including but not limited to, propriety based multiple pin connectors, 15-pin connectors, RJ type connectors, or coaxial cable connectors. The terms connector receptacle, miniature modular jack, dongle connecters, physical/electrical media connector, fixed jack, AC820 compliant jack, XJACK® connectors or sockets, alligator jack, and the like, connote a media connector that may have qualities such as those connectors having physical attributes described in FCC Part 68, Subpart F. Specific terms such as RJ-type, RJ-11, RJ-45, 6-pin miniature modular plug, 8-pin miniature modular plug, USB series "A" and "B" connectors, and similar terminology are all references to specific exemplary physical/electrical media connectors falling within the broader parameters of the term media connectors and are cited by way of example and should not be used to limit the scope of the present invention to specific connectors. This is particularly true as many of the aforementioned connector sockets do not presently provide variable orientation based coupling as used by the present invention, and the custom adaptor to peripheral interface would require modifications to appropriately practice the invention. Therefore, the connection type is not as important as the ability to make a connection between a digital device and an adaptor, replicate the signals from the digital device and pass them through a custom peripheral interface on the adaptor to a peripheral device. For example, if the digital device is coupled using RJ-type connectors to the adaptor then the RJ signals should be replicated and extended to the custom peripheral interface. Connector signals may need to be reoriented at the adaptor before coupling with the peripheral device for a variety of reasons including improved antenna reception, easier detachment, or operable positioning.

FIG. 2 is a perspective view of a custom connector interface for rigidly affixing an adaptor and peripheral in one of four orientations. Specifically, FIG. 2 illustrates the four different orientations possible for custom adaptor 24 with respect to a USB receptacle and peripheral device 30. The four USB contacts are replicated into four duplicate contacts within adaptor interface 26. Each orientation relies on different contact pins in adaptor interface 26 to actively communicate with peripheral interface 28. Groups of active contacts are illustrated in FIG. 3 that correspond to the relative positional orientations of the adaptor interface as illustrated in FIG. 2. The various orientations are used to properly orient antenna 32 in the vertical position on peripheral 30 relative to the orientation of the USB receptacle. This solution provides a simple, reliable, and low cost solution to directly connect the peripheral to the USB connector receptacle. Other solutions compromise one of these elements.

Figure 5:
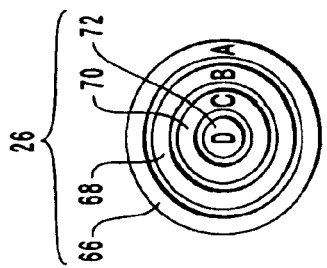
FIG. 5 illustrates a custom connector contact assignment interface for use with the circular contact connector interface as illustrated in FIG. 4.

Custom adaptor 24 comprises a USB connector plug 22 and a custom adaptor interface 26 (described in more detail in FIG. 3). The adaptor interface 26 may employ various contact configurations that allow for the peripheral 30 to be properly oriented relative to the USB plug 22. Exemplary contact configurations are illustrated in FIGS. 3 and 5. The adaptor interface illustrated in FIG. 2 is compatible with the 16-pin custom contact assignment matrix illustrated in FIG. 3. In this manner the custom adaptor may be rotated in any one of the four different possible wire orientations so that the peripheral antenna 32 may be attached to the adaptor in a vertical fashion. In this configuration it is preferred that the custom adaptor 24 only be used with one peripheral device and remain oriented specifically for the individual laptop configuration. In other words, it is anticipated that this adaptor will only need to be set once or at least infrequently as peripheral devices are generally not widely shared between different computers. As such, the connection between the peripheral and the custom adaptor is a strong mechanical connection such that if one pulls on the peripheral the USB connector will be the first connection to break and the custom adaptor will remain attached to the peripheral.

For illustrative purposes only, peripheral device 30 is a USB short-range wireless module, such as a bluetooth radio, rigidly connected to the USB connector receptacle via adaptor 24. Where the adaptor is designed to operably orient antenna 32 in an upward fashion. In one configuration, peripheral device 30 is a transceiver module electrically connected to the custom peripheral interface 28 and to a short-range wireless antenna 32.

Bluetooth, which is only one example of a short-range wireless standard, is actually a combination of specialized computer chips and software that enable small-form factor, low-cost, short-range radio links between laptops, phones, and other portable digital devices. By way of example, peripheral 30 includes all of the necessary hardware components to create the radio link. Specifically, the peripheral bluetooth module incorporates a bluetooth stack, a link manager, a RF baseband radio, and a power amplifier to generate the bluetooth signals. The bluetooth signals are then transmitted to short-range wireless antenna 32. The short-range wireless antenna transceiving the bluetooth signals, with the desired orientation for the short-range wireless antenna being upwards. The standard transfer rate for high-speed bluetooth connections is up to one megabyte per second, over 17 times as fast as a typical modem.

Rather than designing the short-range wireless peripheral 30 to have multiple joints or to use a cable assembly to supply reorientation, the illustrated embodiment of the adaptor and peripheral are configured to accommodate all four USB orientations. As such, the user could determine how the USB port on their laptop was oriented and appropriately connect the peripheral 30 and antenna 32. Assuming that the connected USB peripheral is a single user peripheral, the adaptor interface and peripheral interface could be lastingly coupled in the appropriate orientation relative to the users USB connector receptacle.

FIG. 3a illustrates a 16-pin custom contact assignment matrix for use with the peripheral interface 28 as illustrated in FIG. 2. Specifically, the 16-pin custom contact assignment matrix illustrates how the USB input contacts 15, 17, 19, and 21 are replicated and connected to respective contacts A 36, B 38, C 40, and D 42 in the contact assignment matrix. The adaptor interface on the module is wired in such a way so as to ensure the proper connection of the four USB signal lines in each of the possible orientations of the adaptor interface. The active contacts for each orientation are grouped together. For example, if adaptor 24 is properly oriented then adaptor interface 26 includes the active contacts 36, 38, 40, and 42. When the adaptor is rotated 90-degrees the active adaptor interface is 26' includes contacts 36', 38', 40', and 42'. Yet another 90-degree rotation results in adaptor interface 26" being active with contacts 36", 38", 40", and 42". Finally, a last 90-degree rotation results in adaptor interface 26''' being active using contacts 36''', 38''', 40''', and 42''' to interface with the peripheral interface 28.

Figure 3B:
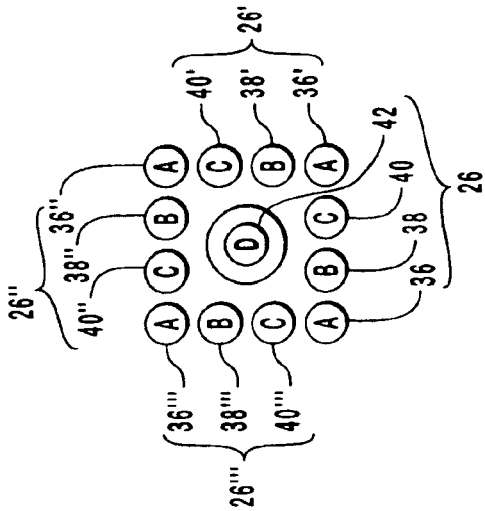

With reference to FIG. 3b, an exemplary 13-pin custom contact assignment matrix used to couple the adaptor with a similar 13-socket peripheral interface. The sockets are configured to receive the pins and electrically and mechanically couple the peripheral to the USB orientation adaptor. Specifically, the 13-pin custom contact assignment matrix illustrates how the USB input contacts 15, 17, 19, and 21 are replicated and connected to contacts A 36, B 38, C 40, and D 42 respectively in the contact assignment matrix. This configuration utilizes a central contact D 42 in all four orientations, thereby minimizing the cost and degree of difficulty associated with construction of the adaptor. As with the previous interface, the interface illustrated in FIG. 3b is wired in such a way so as to ensure the proper connection of the four USB signal lines in each of the possible orientations of the adaptor interface. The active contacts for each orientation are grouped together. For example, if adaptor 24 is properly oriented then adaptor interface 26 includes the active contacts 36, 38, 40, and 42. When the adaptor is rotated 90-degrees the active adaptor interface is 26' includes contacts 36', 38', 40', and 42'. In this embodiment, contact point D 42 is reused with each orientation. Yet another 90-degree rotation results in adaptor interface 26" being active with contacts 36", 38", 40", and 42". Finally, a last 90-degree rotation results in adaptor interface 26''' being active using contacts 36''', 38''', 40''', and 42" to interface with the peripheral interface 28.

Figure 3C:
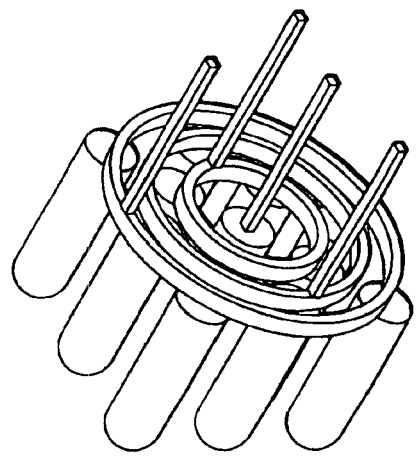

With reference to FIG. 3c, another exemplary 13-pin custom contact assignment matrix used to couple the USB adaptor with a similar 13-socket peripheral interface. As with the previous interfaces, the interface illustrated in FIG. 3c is wired in such a way so as to ensure the proper connection of the four USB signal lines in each of the possible orientations of the adaptor interface. In get and other variation to this embodiment, this interface utilizes a large central contact D 42 that may be used as a guidepost to assist the user in coupling the adaptor and peripheral in each of the orientations. This guidepost is larger than the other contacts, making the insertion of the plug into the socket easier. The rounded nature of the guidepost allows for insertion assistance without committing the coupling to one particular orientation. In an alternative configuration the central guidepost may be shaped to preclude insertion except in one of the specified orientations. For example, a square guidepost would limit insertion to one of four preferred orientations, while a hexagon guidepost would limit insertion to one of six preferred orientations.

Figure 3D:
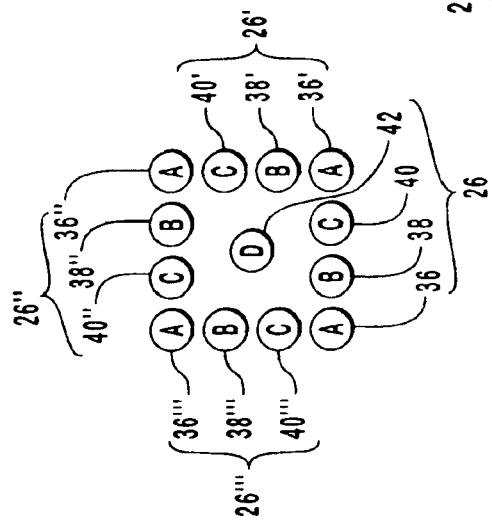

With reference to FIG. 3d, another exemplary 13-pin custom contact assignment matrix used to couple the adaptor with a similar 13-socket peripheral interface. This interface utilizes a central contact surrounded by three sets of concentric contact rings comprising multiple contact points. The contact points on each concentric contact ring may be arranged according to the desired orientations of the plug and socket. FIG. 3d illustrates four possible orientations using USB contact groupings 26, 26', 26", and 26''' where the center contact point D 42 is reused with each orientation. Also, the positional location of each contact A 36, B 38, C 40, and D 42 may be interchanged with other positions without departing from the scope of the invention. As with the previous interface, the interface illustrated in FIG. 3d is wired in such a way so as to ensure the proper connection of the four USB signal lines in each of the possible orientations of the adaptor interface.

Figure 3E:
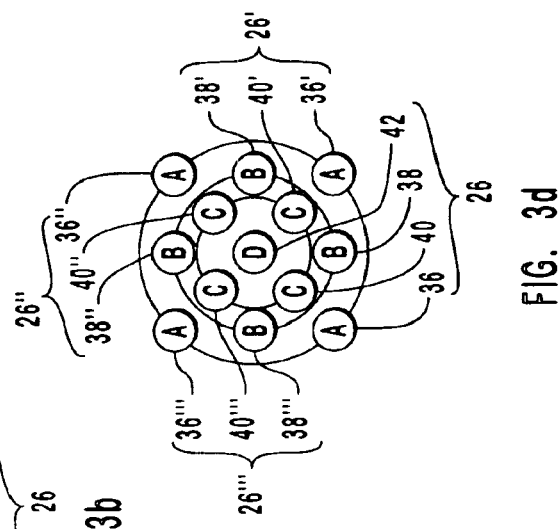

FIG. 3e provides a perspective view of the pin or socket configuration illustrated in 3d. One advantage of this configuration is that it minimizes the manufacturing costs and the size of the custom adaptor. For example, each contact ring may be manufactured using a single stamp and the adaptor may be configured so that the connections do not have to cross each other, where the contacts could short. The metal stamp would resemble a hub with spokes, where each spoke may be bent accordingly to become the contact points for the USB and custom interface sides. This physical orientation is also advantageous in that the separation between rings need only be radially constant allowing the overall size of the plug and socket to be smaller than in many other illustrated configurations. In an alternative configuration, the concentric arrangement could also utilize a center guidepost to direct and assist the plug and socket coupling.

Figure 6:
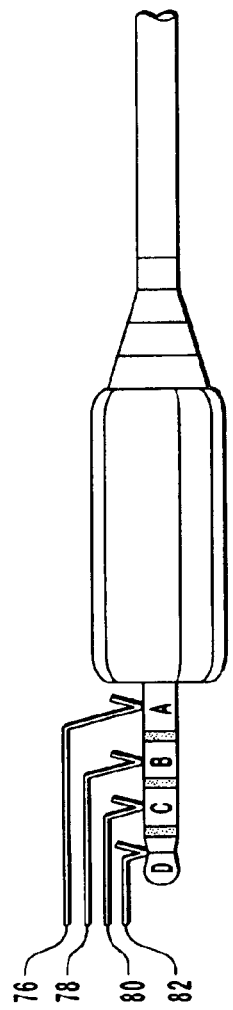
FIG. 6 illustrates a side view of a custom connector for use with a four contact connector.

The contact configuration shown in FIGS. 3, 5, and 6 are only examples of acceptable adaptor interfaces. As is known to one skilled in the art, this particular contact orientation is not the only configuration that might be used. In fact, any orientation, which allows the peripheral to be rotated to the four different orientations, would be acceptable. Furthermore, multiple orientations are possible by expanding the adaptor and peripheral interface to include a section of contacts for each desired orientation. Also the number of contacts may be increased. While the preferred embodiment utilizes the USB standard with four contacts, other standards may require more contacts. Yet another configuration realizes the ability to generate a suitable orienting connector that shares a centralized contact in every possible orientation. Other similar configurations are considered to be within the scope of the present invention.

Figure 4:
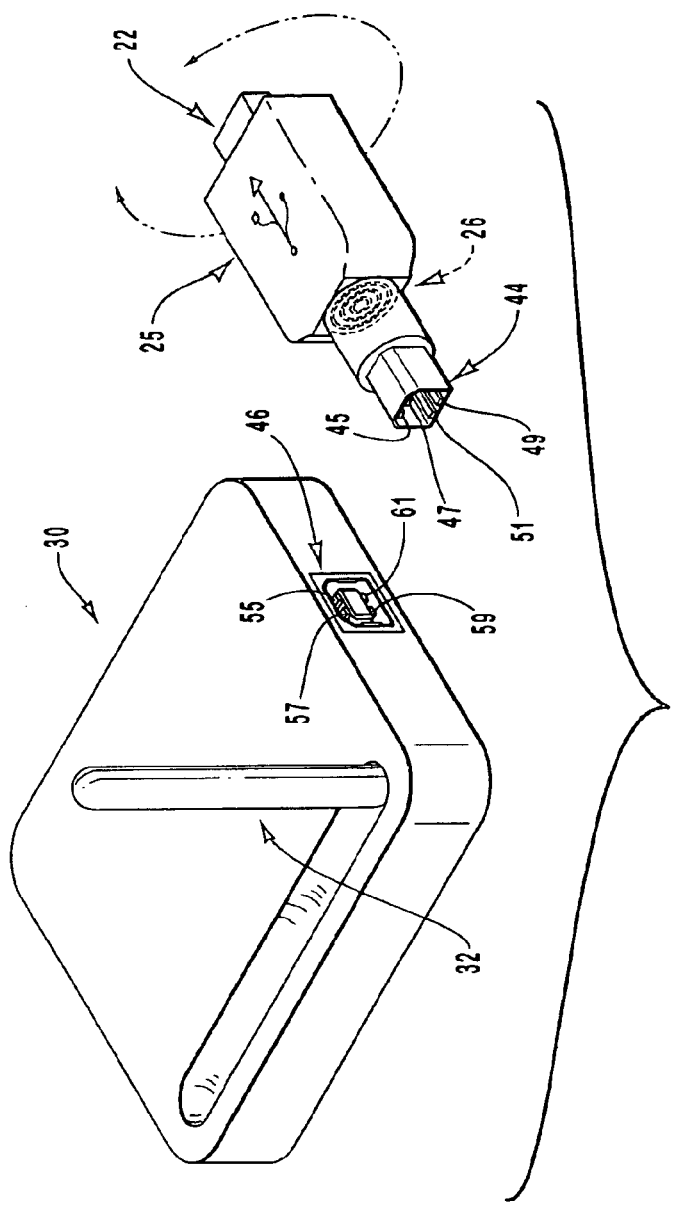
FIG. 4 is a perspective view of a circular contact connector interface for rigidly affixing a rotating adaptor and peripheral together.

FIG. 4 is a perspective view of a rotating adaptor using a circular contact coupling for rigidly affixing a digital device and peripheral together. The circular contact coupling 26 is useful for interfaces where the desired orientation of the peripheral is unspecified or the peripheral device needs to continuously reorient relative to the digital device. The illustrated rotating adaptor 25 includes a USB series "A" plug 22 electrically coupled to a USB series "B" plug 44 via circular contact coupling 26. The circular coupling on the adaptor between the digital device and the peripheral electrically connects the devices without limiting the mechanical coupling to a specific orientation. A specific circular contact coupling is illustrated and described in more detail in FIG. 5.

The USB series "A" plug contacts 15, 17, 19, and 21 (FIG. 1) are electrically coupled to USB series "B" plug contacts 45, 47, 49, and 51. The series "B" plug is adapted to mechanically and electrically couple with series "B" receptacle 46. When properly coupled contacts 45, 47, 49, and 51 of the plug electrically couple with contacts 55, 57, 59, and 61 of the receptacle according to USB specifications. An alternative configuration mechanically couples the series "B" plug and receptacle in a manner that requires a greater extraction force to break the coupling than is required by the coupling between the series "A" plug and receptacle. This ensures that the rotating adaptor will remain attached to the peripheral upon removal of the adaptor from the attached digital device. Yet another configuration uses custom couplings between the rotating adaptor and the peripheral or the digital device that still allows for the rotational reorientation between the peripheral and the digital device via the adaptor.

FIG. 5 illustrates a custom connector contact assignment interface for use with the circular contact connector interface as illustrated in FIG. 4. The USB signals are extended from the plug to the adaptor interface such that the outer contact ring 66 is electrically connected to VBUS signal 15. D− signal 17 is electrically connected to contact ring 68. D+ signal 19 is electrically connected to contact ring 70. Finally, GND signal 21 from the USB connector plug is electrically connected to the center contact 72. The circular contact coupling 26 may use a variety of contact means to transfer the signals to the output lines on the series "B" plug 45, 47, 49, and 51. For example, the rotating adaptor may use capacitive, inductive, or direct connections, such as wire brushes, to engage each contact ring and relay the signals to the peripheral device via the plug regardless of the orientation. Variations of the circular contact connector interface include variable circular contacts in which the electrical contact rings 66, 68, and 70 are only electrically engaged at predetermined positions relative to peripheral device orientations and disengaged or disabled between the predetermined positions. Another configuration uses a continuous electrical connection with slotted mechanical orientations so that the circular contact coupling clicks into each of the mechanical orientations.

One of these concentric variations is illustrated in FIG. 6. Each contact ring A, B, C, and D is separated via insulated sections between each contact The contact rings are concentric around an axis. The contact rings may have smooth or staggered radii. Staggered radii allow for simultaneous contact by the socket contacts 76, 78, 80, and 82. As illustrated in FIG. 6, the socket contacts are also oriented so that only socket contact 82 can electrically couple to contact tip D. Each of the contact points may be interchanged, but the USB contact can only be made if the plug is fully inserted in the socket. Furthermore, the diameters of each contact may vary such as in an increasing diameter at the proximal end of the series of contact sockets.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed and desired to be secured by United States Letters Patent is:

1. An adaptor that enables re-orientation of a peripheral adaptor comprising:
    an Universal Serial Bus (USB) series "A" plug with four contacts;
    a peripheral interface enabled to allow tho attachment of the peripheral in different physical orientations, the peripheral interface being fixably coupled and electrically connected to the USB plug such that the four contacts are electrically extended to the peripheral interface for access by the peripheral.

2. The adaptor as recited in claim 1, wherein the different orientations are one of four possible orientations and wherein the peripheral interface further comprises a four by four matrix of contacts arranged so that the peripheral may use the same four contact connector configuration in all four of the possible orientations, thereby enabling the same peripheral connector to be used regardless of the desired orientation.

3. The adaptor as recited in claim 1, wherein the peripheral interface further comprises a circular contact joint arranged so that the peripheral may use the extended four contacts in all possible orientations, thereby enabling the peripheral connector to remain electrically engaged with the extended contacts regardless of the actual orientation.

4. The adaptor as recited in claim 1, wherein the peripheral is configurable as a wireless device enabling short-range wireless communication, the peripheral further comprising an antenna oriented in an upward direction.

5. The adaptor as recited in claim 1, the peripheral further comprises:
    a wireless transceiver module electrically connected to the peripheral interface that transceives signals to the USB plug; and
    a wireless antenna electrically connected to the wireless transceiver module for transceiving signals generated by the wireless transceiver module.

6. The adaptor as recited in claim 1, wherein the peripheral interface has an extraction force in excess of the extraction force associated with the USB plug so that the adaptor stays attached to the peripheral when the USB plug is extracted from a USB series "A" receptacle.

7. The adaptor as recited in claim 6, wherein the peripheral interface has an extraction force greater than 10 Newtons at an extraction rate of 12.5 mm per minute.

8. The adaptor as recited in claim 6, wherein the peripheral interface has an extraction force greater than 40 Newtons steady state axial load for one minute.

9. An adaptor system for rotationally re-orienting a peripheral device fixably connected to a digital device, the adaptor system comprising;
    a Universal Serial Bus (USB) series "A" plug with four signal wires;
    a custom adaptor interface for electrically extending the signal wires from the plug to the peripheral device;
    a peripheral with desired orientation specific parameters; and
    a custom peripheral interface for electrically coupling with the adaptor interface such that the extraction force exceeds the extraction force of a USB series "A" plug and receptacle.

10. The adaptor system as recited in claim 9, wherein the custom adaptor interface and the custom peripheral interface have a rotatable fixable coupling via continuous circular slide connectors, wherein tho coupling allows for continuous reorienting of the peripheral.

11. A coupling system for orienting an attached peripheral device, the system comprising:
- a digital device having an interface with a specified orientation;
- a peripheral device having an operable orientation;
- a connector for electrically and mechanically coupling to the interface to receive communication signals for the peripheral device; and
- an orienting coupling interface rigidly attached to the connector, the orienting coupling interface having at least one contact for each signal received by the connector and operably orienting to connect with the attached peripheral device in the desired orientation.

12. The coupling system as recited in clain 11, wherein the selectively attachable peripheral device is configurable as a bluetooth compatible module enabling short-range wireless communication, the peripheral device further comprising:
- a wireless transceiver module electrically connected to the orienting interface; and
- a wireless antenna electrically connected to the wireless transceiver module for transceiving the signals generated by the wireless transceiver module.

13. The coupling system as recited in claim 11, wherein the orienting coupling interface replicates each signal of the interface for each orientation, such that the orienting coupling interface provides a replicated signal to the peripheral through all ranges of orientation.

14. The coupling system as recited in claim 11, wherein the orienting coupling interface is a circular contact joint that facilitate re-orientation of the peripheral device and the connector.

15. An adaptor for electrically coupling a peripheral device with a computer, said peripheral device having a peripheral interface with an operable orientation and said computer having a computer interface in a fixed orientation, said adaptor comprising:
- a. a computer interface plug for electrically and mechanically coupling with said computer interface in said fixed orientation;
- b. a peripheral interface plug for electrically and mechanically coupling with said peripheral interface in said operable orientation; and
- c. a contact coupling electrically and mechanically coupled between said computer interface plug and said peripheral interface plug, said contact coupling rotating one of said computer interface plug and said peripheral interface plug to mechanically and electrically retain said computer interface in said fixed orientation and facilitate said peripheral device in said operable orientation.

* * * * *